(12) United States Patent
Katzman et al.

(10) Patent No.: US 7,617,838 B2
(45) Date of Patent: Nov. 17, 2009

(54) GAS PURGE VALVE

(75) Inventors: Youval Katzman, Zichron Yaacov (IL); Mordechai Kandanyan, D.N. Ramat Hagolan (IL)

(73) Assignee: A.R.I. Flow Control Accessories Agriculture Cooperative Association Ltd., D.N. Ramat Hagolan (IL)

( * ) Notice: Subject to any disclaimer, the term of this patent is extended or adjusted under 35 U.S.C. 154(b) by 131 days.

(21) Appl. No.: 10/550,190

(22) PCT Filed: Mar. 23, 2004

(86) PCT No.: PCT/IL2004/000258

§ 371 (c)(1), (2), (4) Date: Sep. 21, 2005

(87) PCT Pub. No.: WO2004/088187

PCT Pub. Date: Oct. 14, 2004

(65) Prior Publication Data

US 2006/0185732 A1    Aug. 24, 2006

(30) Foreign Application Priority Data

Apr. 1, 2003   (IL)   ..................................... 155180

(51) Int. Cl.
*F16K 24/04*   (2006.01)
(52) U.S. Cl. ..................................... 137/202; 137/430
(58) Field of Classification Search .................. 137/202, 137/429–430, 434–437, 409, 448; 251/231, 251/232
See application file for complete search history.

(56) References Cited

U.S. PATENT DOCUMENTS

| | | | | |
|---|---|---|---|---|
| 801,161 A * | 10/1905 | Scutte et al. | ................. | 137/195 |
| 815,268 A * | 3/1906 | Covell | ......................... | 137/202 |
| 1,936,537 A * | 11/1933 | Borden | ........................ | 137/202 |
| 3,168,103 A * | 2/1965 | Kochaver | ..................... | 137/202 |
| 3,252,473 A | 5/1966 | Erickson et al. | .............. | 137/174 |
| 4,770,201 A | 9/1988 | Zakai | ........................... | 137/202 |
| 4,892,285 A * | 1/1990 | Torrence | ................. | 251/129.05 |
| 5,220,982 A * | 6/1993 | Anderson, Jr. | .............. | 188/266 |
| 5,386,844 A * | 2/1995 | Kennedy | ..................... | 137/202 |
| 5,592,963 A * | 1/1997 | Bucci et al. | .................. | 137/202 |
| 5,794,646 A * | 8/1998 | Perkins | ........................ | 137/202 |
| 5,884,342 A * | 3/1999 | Maake | ............................ | 4/236 |
| 5,957,150 A * | 9/1999 | Perkins | ........................ | 137/202 |
| 6,105,608 A | 8/2000 | Katzman | ..................... | 137/491 |

(Continued)

FOREIGN PATENT DOCUMENTS

DE    2420044    4/1974

(Continued)

*Primary Examiner*—Stephen Hepperle
*Assistant Examiner*—Craig M Schneider
(74) *Attorney, Agent, or Firm*—The Nath Law Group; Susanne M. Hopkins; Ari G. Zytcer (57) ABSTRACT

A gas purge valve comprising a housing (12) formed with an inlet (24) and an outlet (30) formed with a valve seating (54), and a sealing assembly (38) comprising a sealing member (70) displaceable between an open position and a closed position. The sealing assembly (38) is supported by an external support lever (42) mechanism extending outside the housing (12), to thereby displace the sealing assembly (38) into sealing engagement with the valve seating at the closed position.

31 Claims, 8 Drawing Sheets

U.S. PATENT DOCUMENTS 6,276,390 B1 * 8/2001 Perkins ....................... 137/202

FOREIGN PATENT DOCUMENTS

| GB | 245551 | 1/1926 |
| GB | 705897 | 3/1954 |
| JP | 03177667 | 8/1991 |
| JP | 98/45631 | 10/1998 |

* cited by examiner

GAS PURGE VALVE

FIELD OF THE INVENTION

The present invention generally relates to fluid flow valves and is particularly, but not exclusively, concerned with such valves which are designed to serve as gas discharge valves or gas purge valves.

BACKGROUND OF THE INVENTION

Air purge valves are designed to be installed in liquid flow systems such as, for example, water main distribution lines or sewage collection systems, or liquid tanks, and are intended to discharge air (typically in water supply systems) or other gasses (e.g. in sewage systems or thick liquid supply systems), thus avoiding the formation and accumulation of gas pockets and bubbles which interfere with the liquid flow and which can also damage accessories and components of the liquid system. On the other hand, when the liquid system is drained, it is required to air the lines so as to avoid their collapse under rapid vacuum build-up.

A basic requirement for gas purge valves is their ability to effectively and rapidly discharge both large and small quantities of gas whilst, at the same time, being or becoming sealed against liquid discharge. Conventional air purge valves are formed with a gas discharge outlet through which the gases are discharged, but which become sealed against liquid discharge by a float located in a valve housing and which becomes pressed against the outlet so as to seal it with a rising level of liquid in the valve housing.

Such valves, when provided with a relatively small discharge outlet are effective for the discharge of small quantities of gas, but cannot cope when large quantities have to be discharged. Where, however, in order to render the valve capable of handling large quantities of gas it is provided with a large discharge outlet (and, consequently, a large dimensioned float), problems arise in ensuring that the valve can readily and rapidly discharge relatively small quantities of gas after the discharge outlet has been sealed against liquid outflow. Thus, once the valve housing is filled with liquid and the float has been pressed against the relatively large outlet so as to seal it, the valve will only reopen once the pressure in the housing has dropped to atmospheric pressure and, as a consequence, such a valve cannot be used for the continuous venting of relatively small amounts of air.

Moreover, such valves have the drawback of being substantially sensitive to the presence of dirt, grit, etc., particularly where manufacturing tolerances or erosion of various components, built-up of dirt or scale, etc., greatly influence the behavior of the float and its response to changes of the fluid flowing therethrough (liquid or gas). Thus, the performance of such air purge valves is somewhat deficient and they may malfunction.

A large variety of gas valves have been proposed for gas purge valves capable of effectively and rapidly discharging both relatively small and large quantities of gas. Such a proposal is to be found in U.S. Pat. Nos. 4,770,201 and 6,105,608. Prior art arrangements, whilst allowing for the effective and speedy opening of the outlet aperture for rapid discharge of relatively small quantities of gas as well as its complete opening for the discharge of large quantities, are nevertheless vulnerable in particular when installed in lines through which dirt flows along with the liquid, e.g. sewage lines.

However, in valves of the type comprising a float member received within the valve housing and being articulated with an outlet sealing means, there is provided some guidance to facilitate regular and smooth displacement of the sealing means. For that purpose it has been suggested to provide a support rod coaxially extending with the sealing means and axially displaceable within an external support bushing. This arrangement however is prone to malfunctioning upon deformation of the support rod and upon entering of dirt to the vicinity of the bushing. Even more so, the axial guidance does not assist in displacement of the sealing means, but rather may cause an obstacle to normal operation thereof.

SUMMARY OF THE INVENTION

It is thus an object of the present invention to provide a gas purge valve in which the sealing member is externally guided so that the valve will operate trouble-free also under extreme dirt conditions.

According to the present disclosed technology there is provided a gas purge valve comprising a housing formed with an inlet and an outlet, said outlet formed in turn with a valve seating, and a sealing assembly comprising a sealing member displaceable between an open position and a closed position; wherein the sealing assembly is supported by an external support lever (pivotable support arm) mechanism, i.e. extending outside said housing, to thereby displace the sealing assembly into sealing engagement with said valve seating at the closed position.

According to a particular design of the present invention the gas purge valve comprises a housing fitted with an inlet being in flow communication with a float chamber within the housing, and an outlet formed at an upper end thereof; a sealing assembly for sealing said outlet, and a float disposed within said float chamber articulated to the sealing assembly; said sealing assembly being carried at a first end of an external support lever having a second end thereof pivotally attached to the housing.

The float member is directly or indirectly articulated to the sealing assembly. According to one arrangement the float is coupled to the sealing assembly by a rigid link and according to another embodiment the link is flexible (e.g. a cord, etc.) or comprises one or more rigid links with at least one degree of freedom. According to a different arrangement, the float is directly articulated to the sealing assembly or to a component associated therewith.

Furthermore, the support lever may be received within a water-tight casing, wherein the casing is received within an outlet duct extending from the valve outlet and being in flow communication therewith.

According to an improved modification of the invention, the valve outlet is of the combined type comprising a major, kinetic outlet for high flow rate gas flow, and an auxiliary, automatic outlet for low flow rate gas flow. By a particular design, the auxiliary outlet comprises an aperture adjoined by an auxiliary valve seating, said auxiliary outlet aperture being substantially smaller in area than the major outlet aperture; a flexible closure membrane secured at one end to the sealing member of the major outlet and adapted to be biased against said auxiliary valve seating so as to seal said auxiliary outlet aperture; the float member being articulated to an opposite end of said membrane.

By one particular design, the auxiliary valve seating has a substantially elongated slit-like shape, communicating at one end thereof with the major outlet aperture.

The support lever can be provided with arrangements for altering the moment of rotation about a pivoted end thereof and/or may comprise dampening arrangements.

According to one particular embodiment, the support lever is pre-loaded in either or both directions. In one sense, the support lever may be biased in a direction so as to open the valve (i.e. to disengage the sealing assembly from the valve seating) so as to reduce or prevent hammering. Biasing the support lever in an opposite sense, i.e. into engagement with the valve seating of the sealing assembly, entails tight sealing. This pre-loading may be adjustable.

By a specific arrangement, the pre-loading mechanism comprises an axle attached to the lever and received within a casing fixedly supported by the housing, a coiled spring having one end thereof engaged with said axle and an opposed end thereof engaged with a tension setting nut rotatable with respect to said axle in a first sense to tension the spring, and in an opposite sense to loosen the spring. Other arrangements may include provision of various types of springs, dampeners, balance-weights, dynamic weights (e.g. water weight, etc.).

By one particular application, the valve according to the invention is used in conjunction with a sewage system.

BRIEF DESCRIPTION OF THE DRAWINGS

In order to understand the invention and to see how it may be carried out in practice, some embodiments will now be described, by way of non-limiting examples only, with reference to the accompanying drawings, in which:

FIGS. 1A and 1B illustrate a gas purge valve according to a first embodiment of the present invention, wherein:

FIGS. 5A and 5B illustrate a gas purge valve according to a second embodiment of the present invention, wherein:

FIGS. 7A to 7D illustrate a biasing mechanism associated with the support lever of the valve according to the present invention, wherein:

DETAILED DESCRIPTION OF THE INVENTION

Figures 1A, 1B:
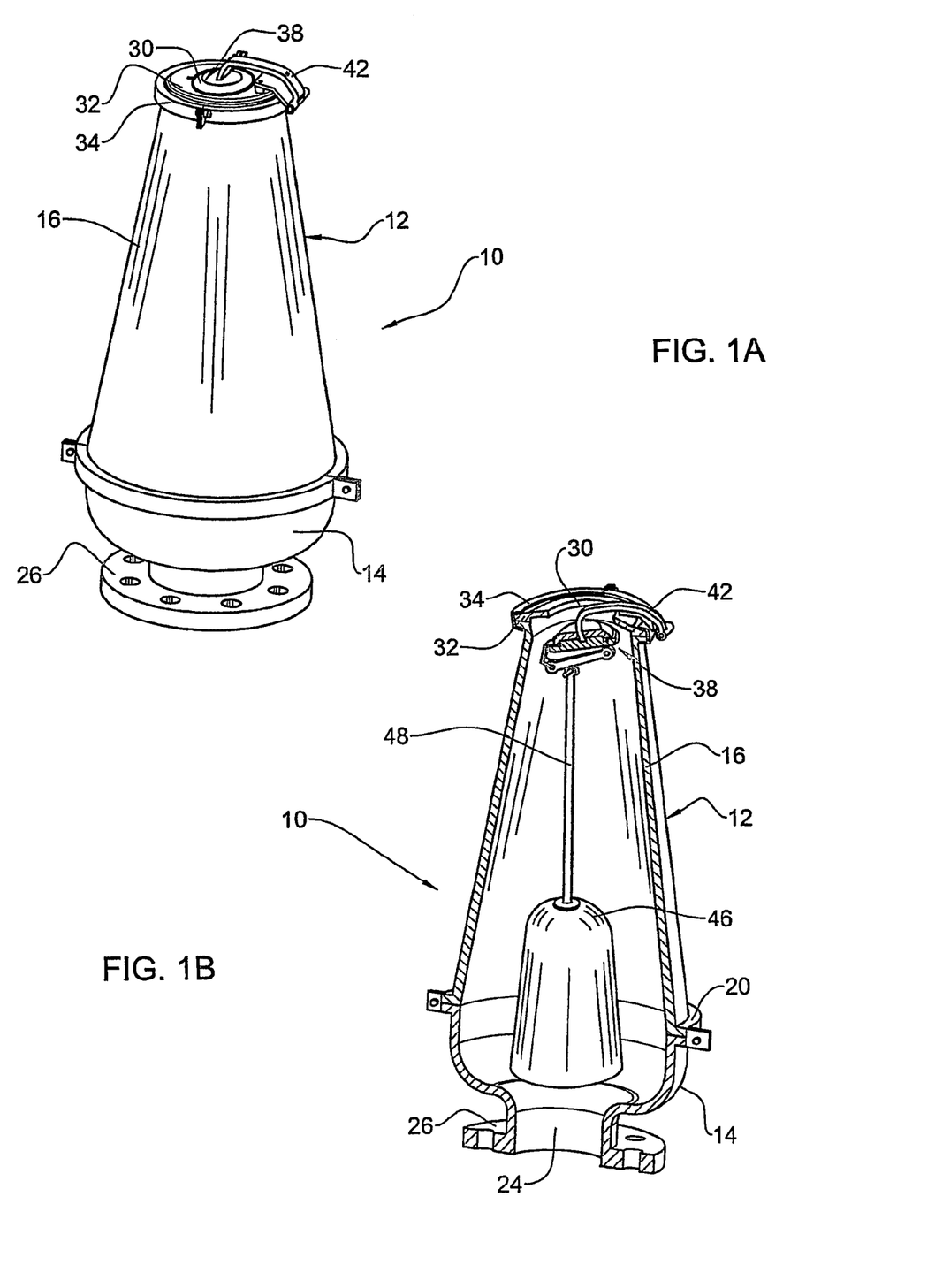
FIG. 1A is an isometric view of the valve in a closed position.
FIG. 1B is a sectional isometric view of the valve in its open position.

Attention is first directed to FIGS. 1A and 1B of the drawings illustrating a gas purge valve in accordance with one embodiment of the present invention, generally designated 10, which in the present example is of the type fitted for cooperation with a sewage or waste line.

The valve 10 comprises a frustoconical (though other shapes are possible too) metal housing 12 comprising a base portion 14 and an upper portion 16 secured to one another by a coupling flange 20. The housing 12 is formed with an inlet port 24 and comprises a base flange 26 for attaching the housing to the liquid line. An outlet port 30 is formed at a top cover member 32 flanged to the upper housing portion 16 by means of articulating flange 34.

A sealing assembly, generally designated 38, extends within the housing 12 and is articulated to an external support lever 42 as will be explained in further detail herein below. Pivotally supported from the sealing assembly 38 there is a float member 46 (FIG. 1B) suspended by a rigid connecting rod 48 pivotally secured to the sealing assembly 38.

However, it is appreciated that the float member 46 may be directly or indirectly articulated to the sealing assembly 38. According to other embodiments (not shown) the link is flexible (e.g. a cord, etc) or comprises one or more rigid links with at least one degree of freedom. According to a different arrangement (not shown) the float member 46 may be directly articulated to components associated with the sealing assembly 38, e.g. support member 72 or pivot bar 80' (FIG. 2B).

Figure 2A:
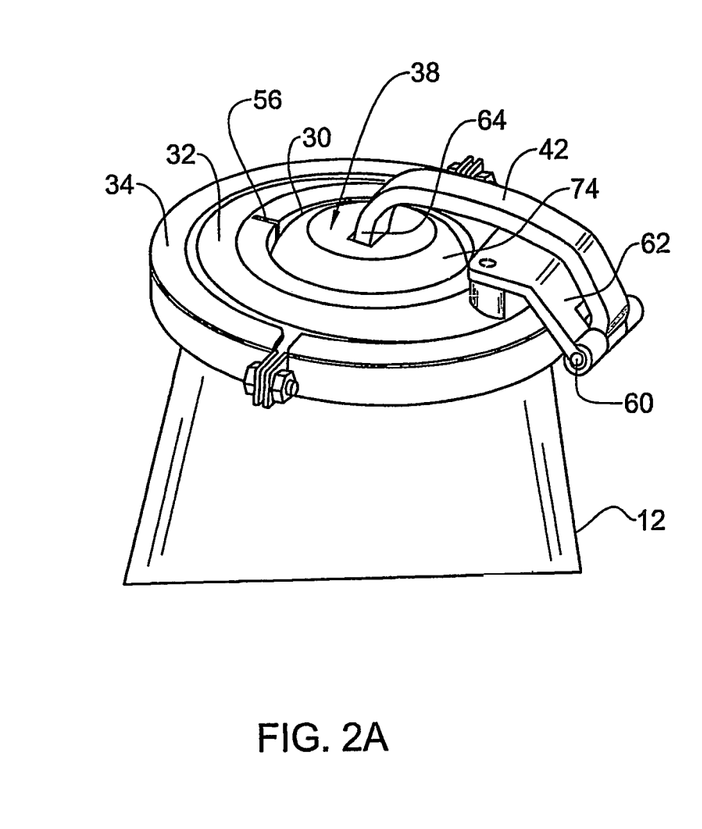
FIGS. 2A and 2B illustrate a top portion of the valve of FIG. 1 in its closed position, in an isometric view and in a sectioned view, respectively.
Figure 2B:
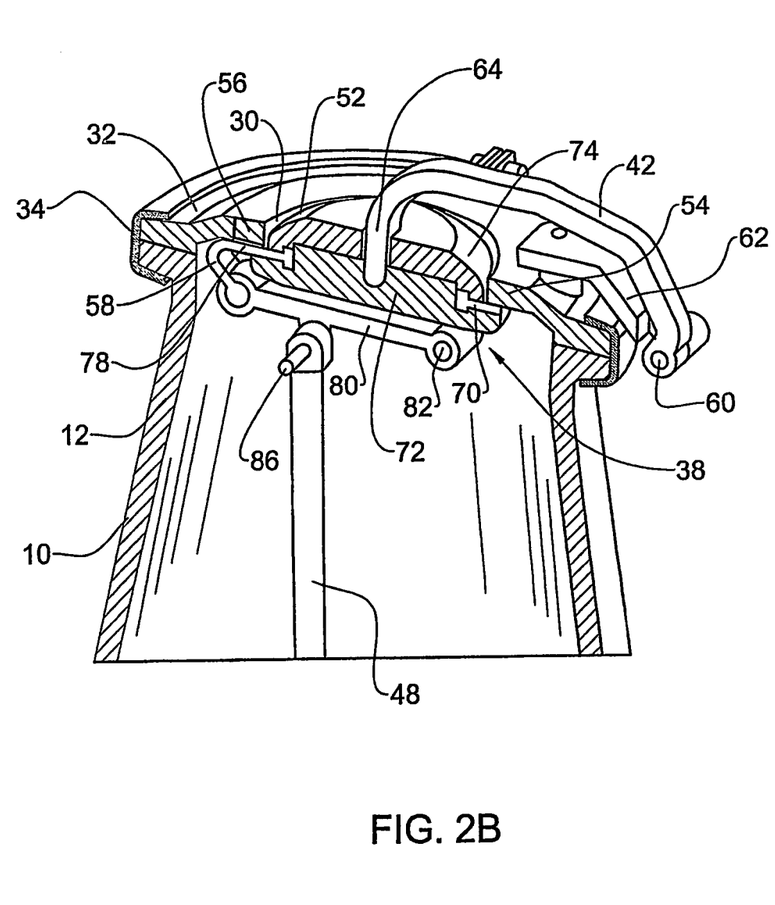

For better understanding the design of the valve outlet port 30 and the sealing assembly 38, further attention is directed to FIGS. 2A and 2B. The outlet port 30 comprises a circular major outlet 52 defining a major valve seating 54 and further comprising a slit-like auxiliary outlet 56 having an auxiliary valve seating 58 (FIG. 2B).

The support lever 42 is pivotally secured at a first end thereof 60 to a support extension 62 fixedly attached to the housing 12. A second end 64 of the support lever 42 is articulated to the sealing assembly 38.

The sealing assembly 38 comprises a major sealing member 70 (e.g. made of a resilient material) retained by a rigid support member 72 and is clamped by a top retaining member 74 whereby the sealing member 70 has an exposed edge for sealingly bearing against the boundaries of the major valve seating 54 (FIG. 2B). Sealing member 70 is integrally formed in the present example with a strip-like sealing membrane 78 having one end thereof articulated to a free end of a pivot bar 80, the latter having an opposed end thereof pivotally secured at 82 to the support member 72. Connecting rod 48 of the float member 46 is pivotally secured at 86 to said pivot bar 80.

The valve 10 in accordance with the present invention has three principle positions as illustrated in FIGS. 2, 3 and 4. The first position is illustrated in FIGS. 2A and 2B depicting the valve 10 in its closed position, wherein the sealing member 70 tightly bears against the valve seating 54 of the major outlet 52 and similarly the strip-like sealing membrane 78 sealingly bears against the auxiliary valve seating 58 of the auxiliary outlet 56. This position takes place when liquid enters the housing 12, applying buoyancy force on float member 46 which by means of rod 48 ensures tight sealing engagement of the sealing member 70 and the sealing membrane 78. It is to be appreciated that the auxiliary outlet 56 may be otherwise formed then a slit-like aperture and may adjoin the major outlet 52 rather than be bounded thereby. It is also to be understood that the valve 10 may be a so-called kinetic valve, suited for gas flow at high flow rates and not comprising the so-called automatic portion, i.e. suited for low flow rate gas flow.

Figure 3A:
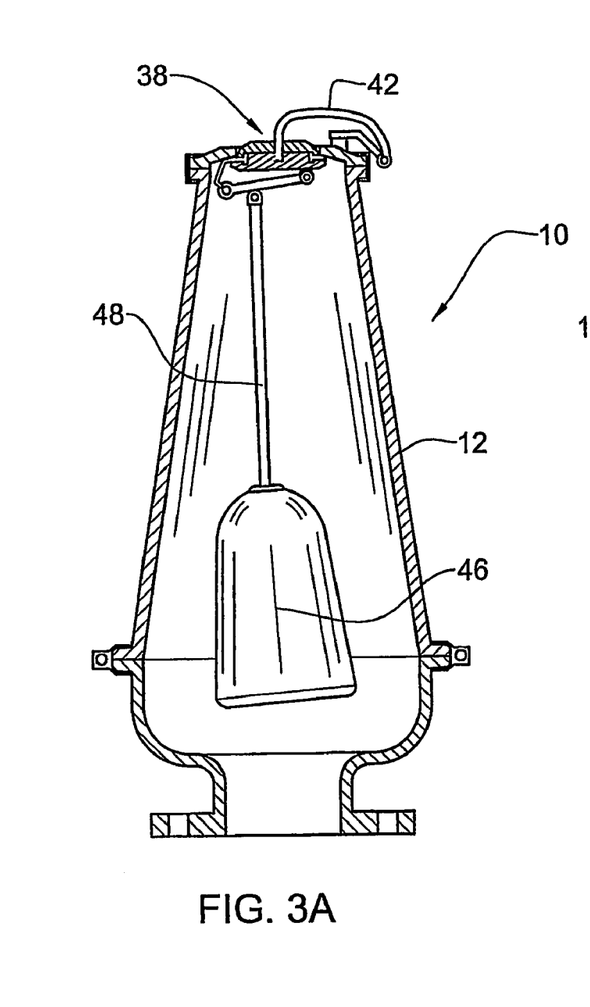
FIGS. 3A and 3B illustrate the valve of FIGS. 1A and 1B in its partially open (automatic) position, in a sectioned view and in an isometric sectioned view, respectively.
Figure 3B:
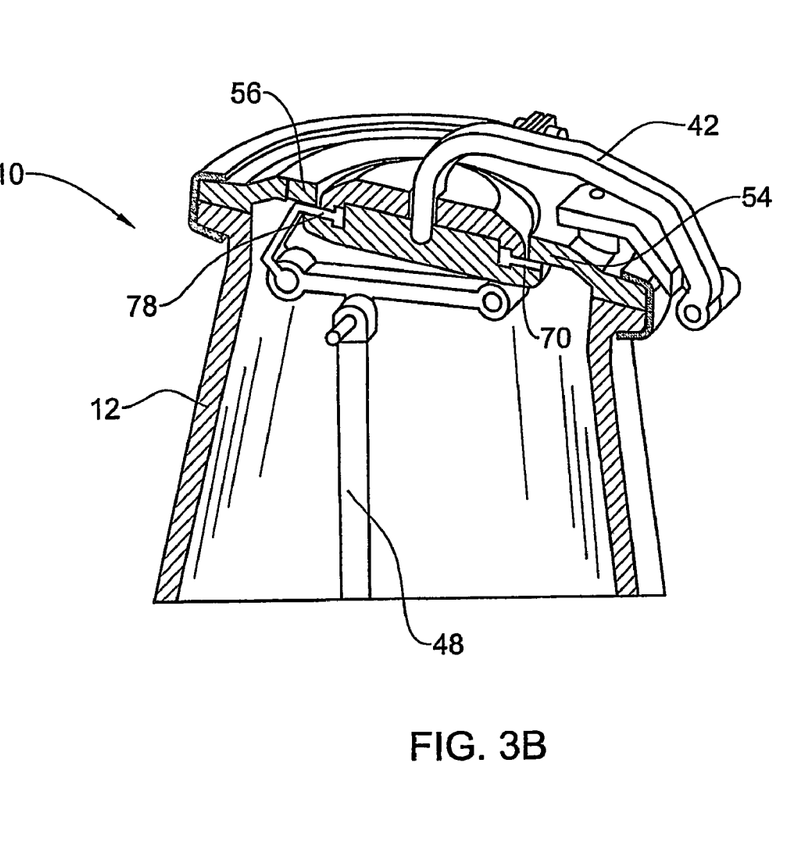

Turning now to FIGS. 3A and 3B, the valve 10 is illustrated in the so-called automatic position wherein the strip-like sealing membrane 78 detaches from the auxiliary outlet 56 whilst the sealing member 70 remains tightly engaged with the major valve seating 54. This situation occurs while the float member 46 is only partially immersed in liquid within the housing 12. When the auxiliary outlet 56 is open, it is suitable for discharging gases from the valve also at significantly low flow rate, also when the pressure within the housing 12 is high.

Figure 4A:
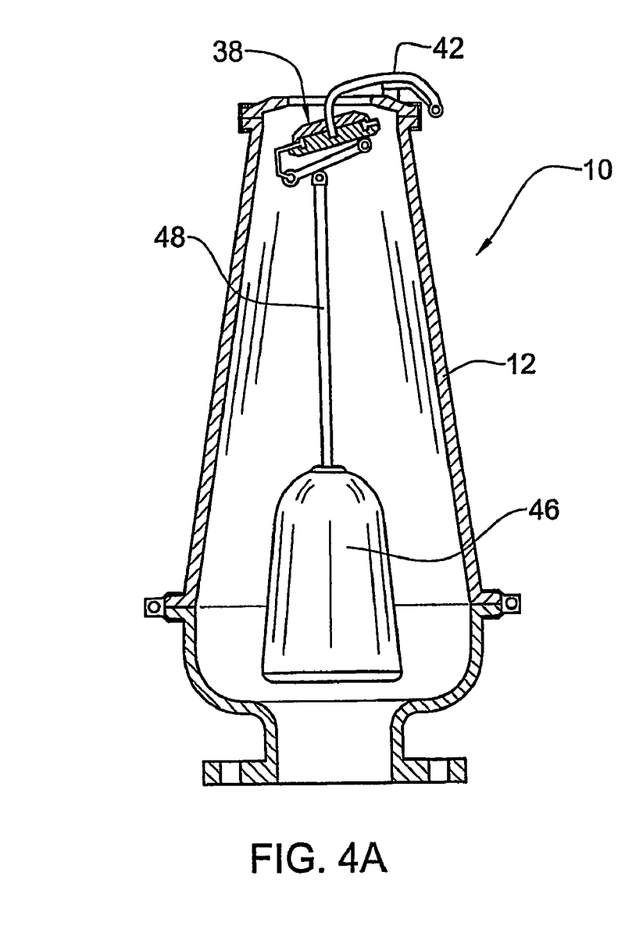
FIGS. 4A and 4B illustrate the valve of FIGS. 1A and 1B in its fully open (kinetic) position, in a sectioned view and in an isometric sectioned view, respectively.
Figure 4B:
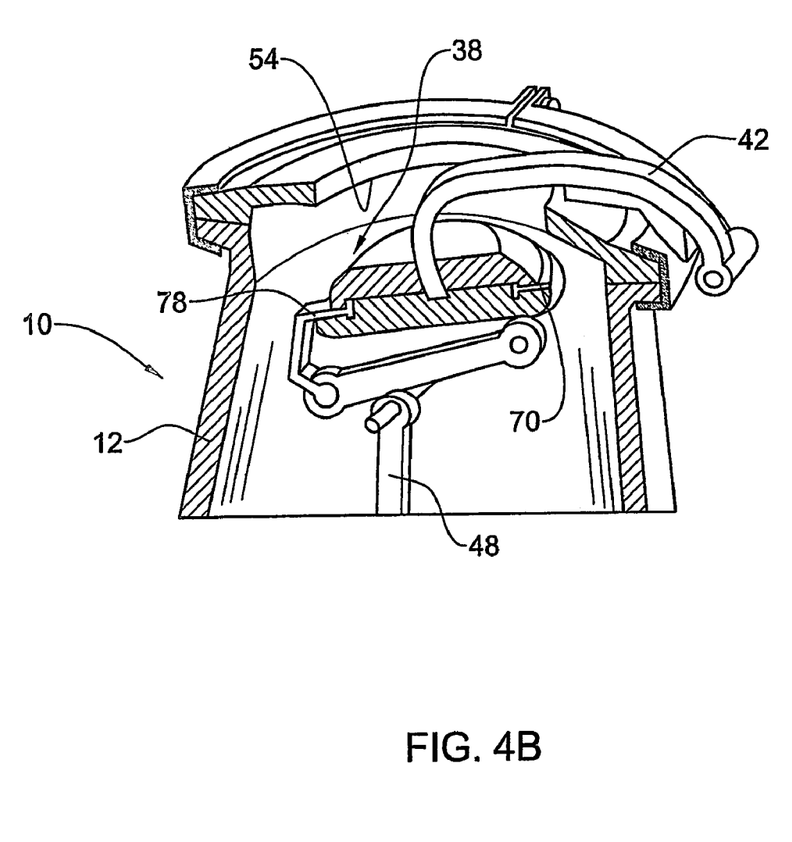

In the position illustrated in FIGS. 4A and 4B, the valve 10 is shown in a fully opened position, also referred to as a kinetic position, wherein the sealing member 70 detaches from the major valve seating 54 in the absence of liquid within the housing 12. The situation is useful for allowing air egress into the system, e.g. upon draining of the system. Alternatively, this position is useful when the system is filled with a liquid, in order to discharge large amounts of gas (typically air).

Of particular importance in the embodiment depicted in FIGS. 1 to 4 is the externally extending support lever 42 which is not influenced by flow or pressure considerations occurring within the housing 12 and even more so, dirt typically flowing in such systems (in particular where the valve 10 is used with a sewage system) does not affect the support of the sealing assembly 38 and proper sealing is obtained.

It is further appreciated that the float member 46 may be directly articulated to the sealing assembly 38, e.g. by omitting the connecting rod 48.

It is also noted that the external support lever 42 enables displacement of the sealing assembly 38 to significantly evacuate the housing 12 via the outlet port 30 (FIG. 4B) to thereby facilitate gas flow at high flow rates.

Further attention is now directed to FIGS. 5 to 7 illustrating another embodiment of a valve in accordance with the present invention wherein like components have been designated same reference numbers shifted by 200.

Figure 5A:
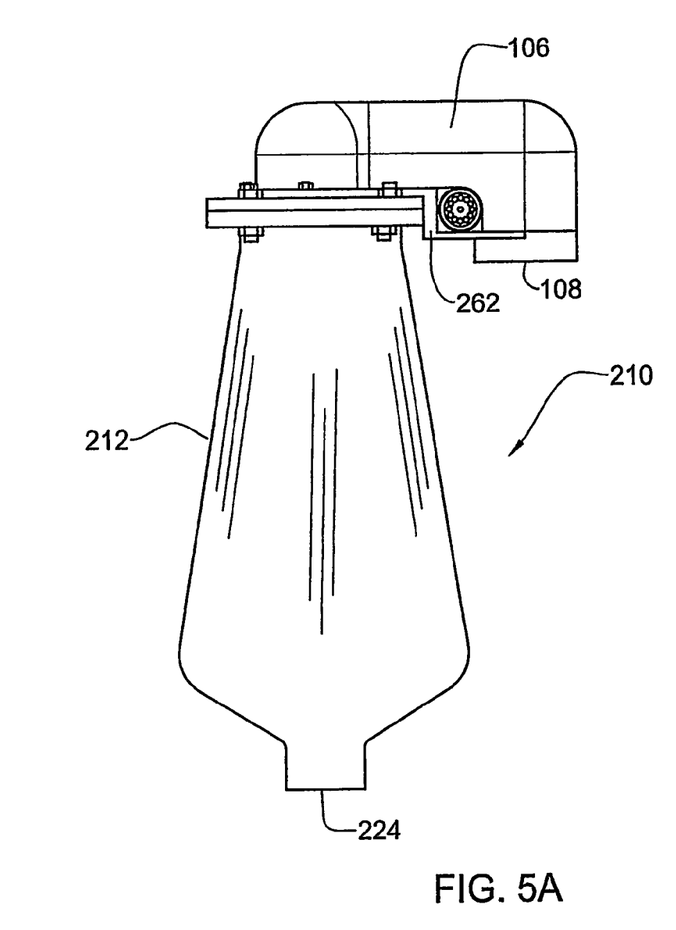
FIG. 5A is a side view of the valve.
Figure 5B:
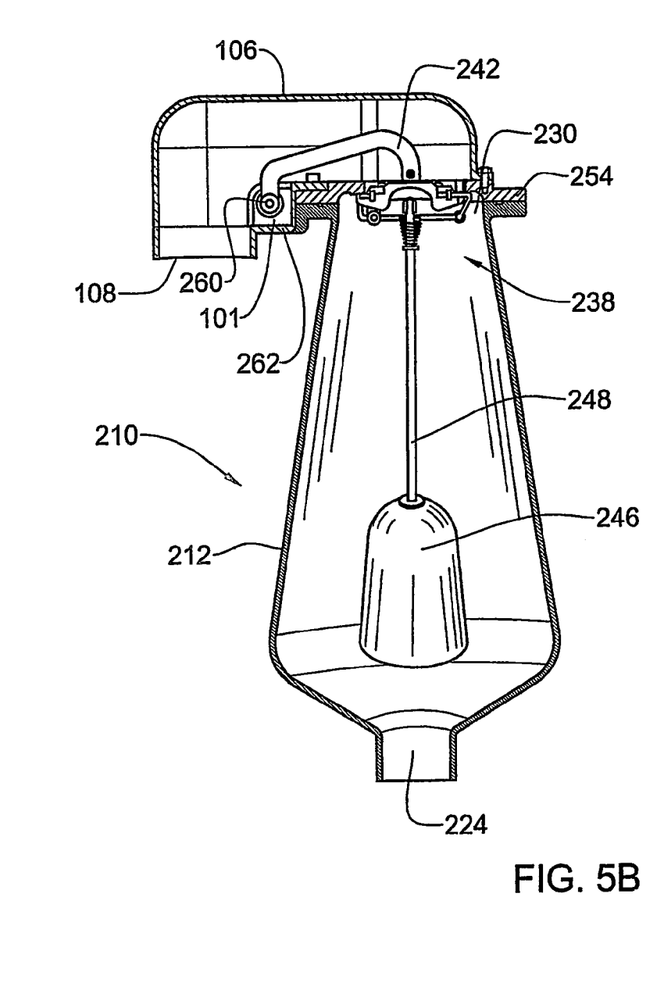
FIG. 5B is a longitudinal sectioned, mirror image, of the valve of FIG. 5A.

Turning first to FIGS. 5A and 5B, there is illustrated a valve 210 comprising a housing 212 having a frustoconical shape formed with an inlet port 224 and an outlet port 230 (FIG. 5B). The valve 210 is fitted with a sealing assembly 238 from which a float member 246 is suspended by means of a float connecting rod 248. It is further noted that the sealing assembly 238 (abutting a valve seating 254) is supported by an external support lever 242 pivotally secured at 260 via a pre-loading mechanism 101 to a support extension 262 fixedly attached to the housing 212. The particular design and purpose of the pre-loading mechanism 101 will be apparent hereinafter by particular reference to FIGS. 7A to 7B.

It is further noted in FIGS. 5 and 6 that the external support lever 242 extends through an outlet duct 106 extending from the outlet port 230 to an outlet opening 108. If desired, a screen may be fitted at the outlet opening 108 (not shown) to prevent ingress of insects and tampering with the sealing assembly 238 (e.g. in a water supply system).

Figure 6A:
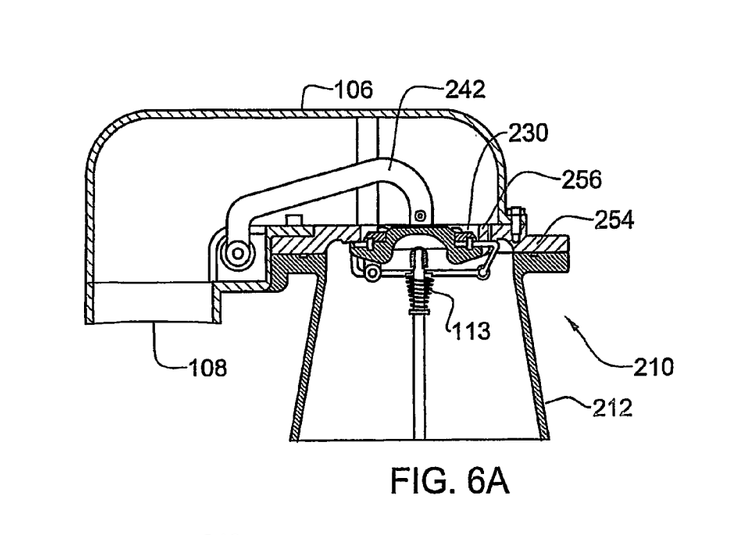
FIGS. 6A to 6C are sectional views through a top portion of the valve of FIGS. 5A and 5B, illustrating the sealing portion in a closed position, a partially open (automatic) position, and in a fully open (kinetic) position, respectively.
Figure 6B:
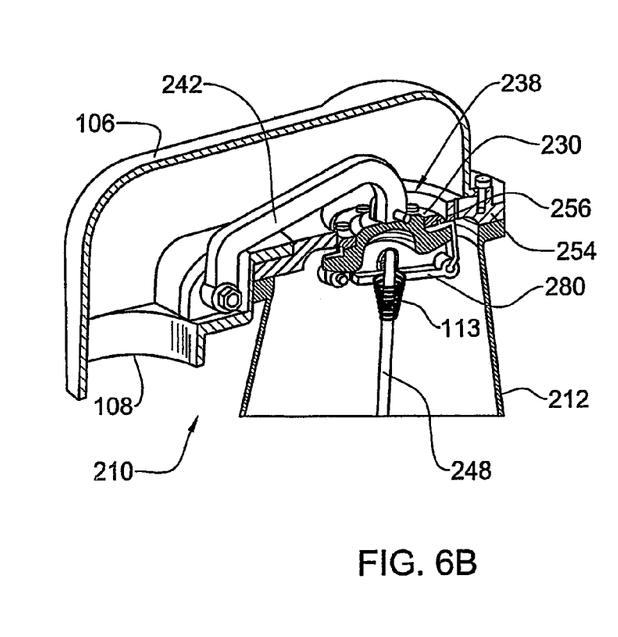
Figure 6C:
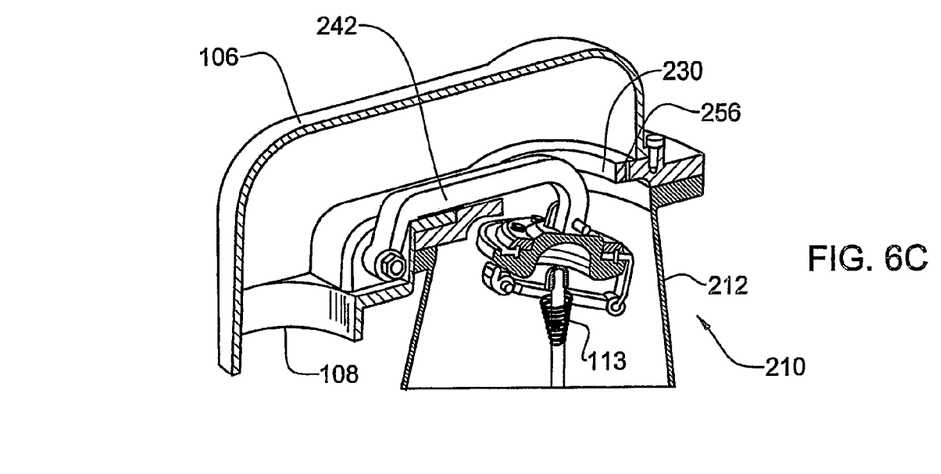

With further attention now directed to FIGS. 6A-6C the valve 210 is illustrated in a completely closed position (FIG. 6A) where both the major outlet 230 and the auxiliary outlet 256 are sealed. In the position seen in FIG. 6B, the valve 210 is in its partially open position wherein the major outlet 230 is sealed and the auxiliary slit-like outlet 256 is open. In FIG. 6C both the major outlet 230 and the auxiliary outlet 256 are fully open. These positions correspond with the positions illustrated in FIGS. 2, 3 and 4, respectively.

As can further be noted in FIGS. 6A-6C, the float connecting rod 248 is loosely connected to a connecting bar 280 of the sealing assembly 238 though there is provided a coiled spring 113 for dampening the direct coupling between the float member 246 and the sealing assembly 238 so as to minimize motion transfer from the float member to the sealing assembly during swinging and buoyant motion of the float member. As already mentioned, the float member 246 may be coupled to the sealing assembly 238 by other arrangements which mute the dangling motion of the float member.

Figure 7A:
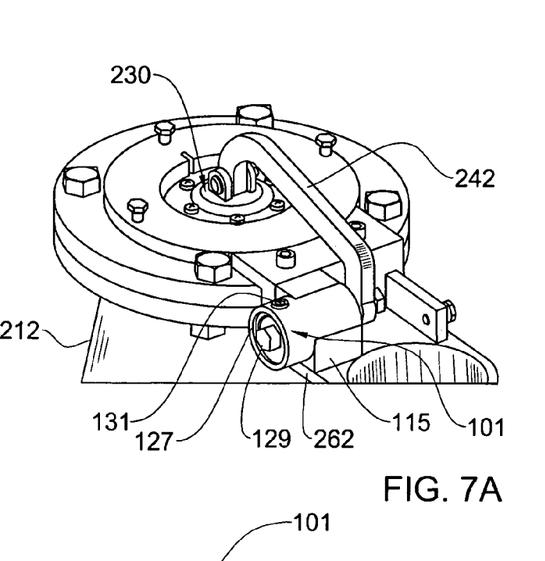
FIG. 7A is an isometric view of the top region of the valve.
Figure 7B:
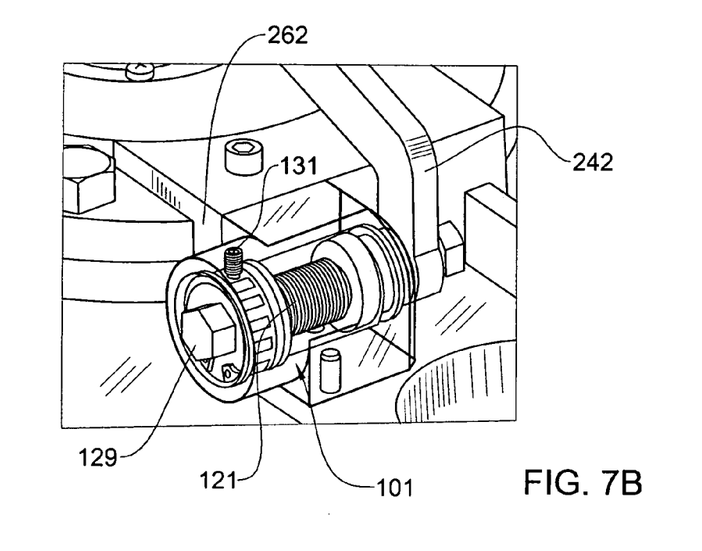
FIG. 7B is an isometric view of the biasing assembly in larger scale, its casing made translucent.
Figure 7C:
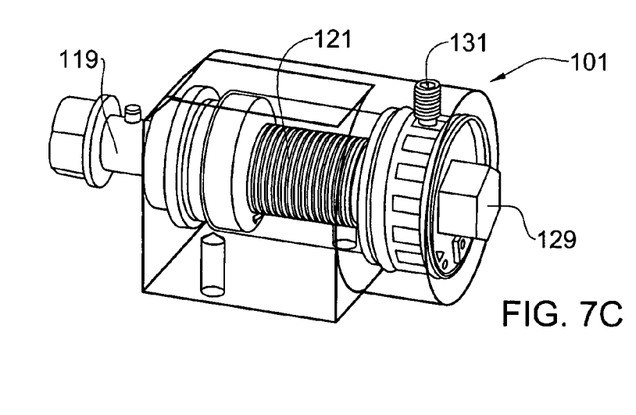
FIG. 7C is an isometric view of the biasing assembly detached from the valve housing, its casing made translucent.
Figure 7D:
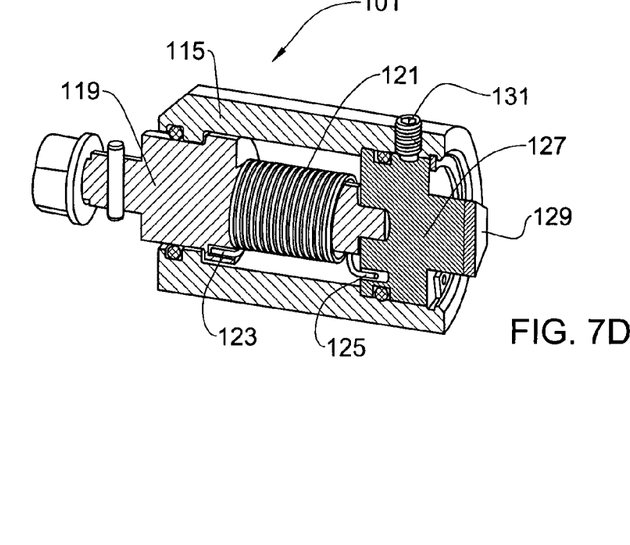
FIG. 7D is a sectioned isometric view of the biasing assembly of FIG. 7C.

Further attention is now directed to FIGS. 7A-7D illustrating the pre-loading mechanism 101 comprising a sealed casing 115 secured to the housing 212 and to the support extension 262 (FIGS. 7A and 7B). The external support lever 242 is formed with a pivot axle 119 coaxially received within the casing 115 wherein a coiled spring 121 has one end thereof 123 fixedly secured to the axle 119 (FIG. 7D) with its opposed end 125 fixedly received within a tension adjusting member 127 formed with a hexagonal head 129 and where a set screw 131 projects through the casing 115 for arresting the adjusting member 127 at any angular position depending on the required damping force.

The arrangement is such that the support lever 242 is biased in a direction so as to displace the sealing assembly 238 into sealing engagement with the valve seating 254 whereby the valve 210 is suitable for use in particular as an air inlet valve, i.e. useful when a fluid conduit is drained, etc. The support lever 242 may be pre-loaded in a variety of different ways, such as, for example, by weights (mass elements or liquid within the housing 212), elastic biasing means, dynamic weights (e.g. liquid chambers), etc.

It is noted that is also possible to provide a suspending arrangement for delaying motion of the sealing assembly 238 into the sealing position. Such suspension may be obtained for example by providing a viscous or visco-elastic damping mechanism or elastic means, to thereby sustain sealing engagement of the sealing assembly 238 with the valve seating 254, to thereby reduce or eliminate hammering. However, it is to be appreciated that dampening means may be provided in addition or without pre-loading of the support lever 242, in any direction (i.e. closing or opening).

Figures 8A, 8B:
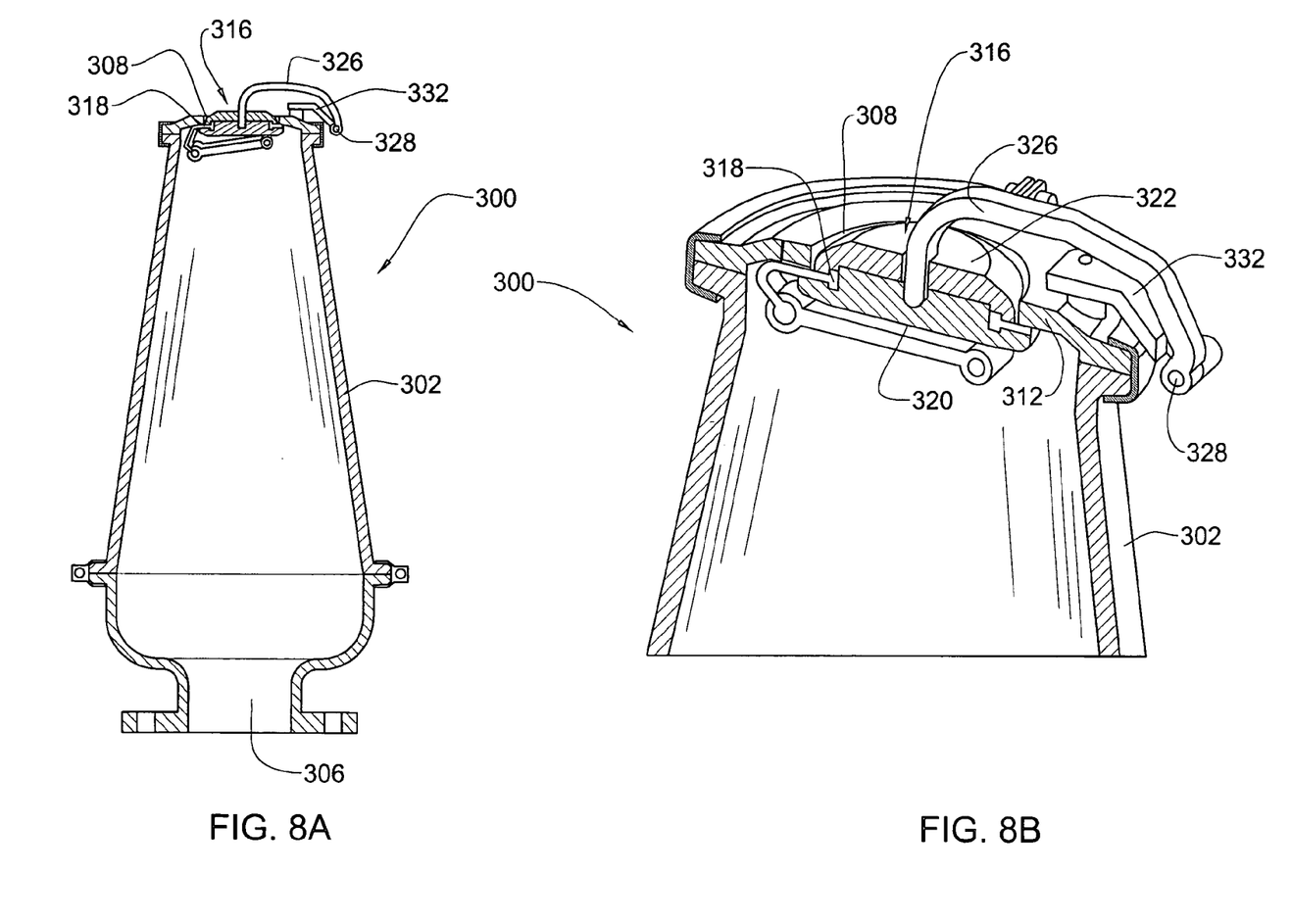
FIG. 8A is a sectioned view of a gas purge valve according to another embodiment of the present invention, illustrated in a normally-closed position.
FIG. 8B is an enlargement of the top portion of the valve, in its closed position.

Further attention is now directed to FIGS. 8A and 8B of the drawings, directed to a modification of a valve according to the present invention, generally designated 300. The valve 300 is similar to the valve of FIG. 1B, the major difference residing in that it does not comprise a float member (46 in FIG. 1B) and in that the sealing assembly is merely of the so-called kinetic type, i.e. adapted for gas flow at high rates.

According to the embodiment of FIGS. 8A and 8B a housing 302 is formed with an inlet 306 (not seen in FIG. 8B) and an outlet 308 formed in turn with an outlet valve seating 312 (best seen in FIG. 8B). A sealing assembly generally designated 316 comprises a sealing member 318 (e.g. made of a resilient material) retained by a rigid support member 320 and is clamped by a top retaining member 322, whereby an exposed peripheral portion of the sealing member 318 is fitted for sealingly bearing against the boundaries of the valve seating 312.

Sealing member 318 is coupled to a pivotal arm/support lever 326, which is pivotally secured at a first end thereof 328 to a support extension 332 fixedly attached to the housing 302. According to the particular illustrated embodiment, the sealing assembly is rigidly linked to the support lever 326.

Support lever 326 is biased into a normally-closed position, e.g. by a spring (not seen), whereby the sealing assembly 316 is in sealing engagement with the valve seating 312. This structure provides a gas inlet valve, i.e. a valve admitting gas inlet into the valve housing 302 e.g. upon draining of the line connected to the valve. As mentioned hereinabove, there may be provided various dampening means to reduce or eliminate hammering during operation of the valve 300.

Whilst several embodiments have been shown and described, it is to be understood that it is not intended thereby to limit the disclosure, but rather it is intended to cover all embodiments, modifications and arrangements falling within the spirit and the scope of the present invention, as defined in the appended claims, mutatis mutandis.

The invention claimed is:

1. A gas purge valve comprising a housing fitted with an inlet being in flow communication with a float chamber within the housing, and an outlet formed at an upper end thereof, said outlet formed with a valve seating, a sealing assembly disposed within said float chamber for sealing said outlet, and a float disposed within said float chamber and being pivotally attached to the sealing assembly by a rigid link; said sealing assembly being carried at a first end of an external support lever, the external support lever extending outside the housing and comprising a second end pivotally attached to the housing at an outside portion thereof allowing the sealing assembly freedom to self align with the valve seating at a closed position.

2. A gas purge valve comprising: a housing having a valve inlet and a valve outlet; a valve seating defined at said valve outlet; a sealing assembly comprising a sealing member adapted for sealing engagement with said valve seating; a float member articulated to said sealing assembly within the housing, and being displaceable susceptive to liquid level within the housing; and an external support lever comprising a first end being internally received within the housing when in an open position, the first end being articulated to the sealing assembly, the external support lever extending outside the housing and comprising a second end pivotally attached to the housing at an outside portion thereof, allowing displacement of the sealing assembly along a non-linear path between an open position and said closed position, and allowing the sealing assembly freedom to self align with the valve seating at a closed position.

3. A gas purge valve comprising a housing formed with an inlet and an outlet, said outlet formed with a valve seating, and a sealing assembly comprising a sealing member displaceable between an open position and a closed position; the sealing assembly being internally received within the housing, when in the open position; wherein the sealing assembly is supported by a first end of an external support lever mechanism, the external support lever mechanism extending outside said housing and comprising a second end pivotally attached to the housing at an outside portion thereof to form a pivotal attachment therewith to thereby displace the sealing assembly into sealing engagement with said valve seating at the closed position, the pivotal attachment displacing the sealing assembly along a non-linear path between said open position and said closed position, the gas purge valve further comprising a float member pivotally secured to said sealing assembly within the housing, and being displaceable susceptive to liquid level within the housing.

4. The gas purge valve according to claim 3, wherein the support lever is provided with a pre-loading mechanism for adjusting the moment of rotation about a pivoted end thereof.

5. The gas purge valve according to claim 3, wherein the support lever is provided with dampening arrangements to dampen displacement of the sealing assembly into the closed or open position.

6. The gas purge valve according to claim 3, wherein the housing has a frustoconical shape.

7. The gas purge valve according to claim 3, comprising a casing fixedly supported by the housing, wherein the casing is received within an outlet duct extending from the valve outlet and being in flow communication therewith.

8. The gas purge valve according to claim 3, for use in conjunction with a sewage system.

9. The gas purge valve according to claim 3, wherein the support lever is coupled to the sealing assembly allowing freedom for the sealing assembly to self align with the valve seating at a closed position.

10. The gas purge valve according to claim 3, wherein the float member is suspended from the sealing assembly.

11. The gas purge valve according to claim 10, wherein the float member is suspended from the sealing assembly by a rigid connecting rod.

12. The gas purge valve according to claim 11, wherein an end of the connecting rod is pivotally coupled to the sealing assembly.

13. The gas purge valve according to claim 11, wherein the connecting rod is spring-biased to dampen motion of the connecting rod.

14. The gas purge valve according to claim 3, wherein the support lever is pre-loaded so as to effect engagement of the sealing assembly with the valve seating.

15. The gas purge according to claim 14, wherein pre-loading of the support lever is adjustable to thereby adjust the force required for sealing the valve.

16. The gas purge valve according to claim 3, wherein there is further provided a pre-loading mechanism for pre-loading the support lever so as to adjust the moment about a pivot end thereof.

17. The gas purge valve according to claim 16, wherein the pre-loading mechanism comprises an axle attached to the support lever and received within a casing fixedly supported by the housing, a coiled spring having one end thereof engaged with said axle and an opposed end thereof engaged with a tension setting nut rotatable with respect to said axle in a first sense to tension the spring, and in an opposite sense to loosen the spring.

18. The gas purge valve according to claim 17, wherein the tension setting nut is rotatably fixable at different positions so as to allow for adjusting the pre-loading setting.

19. The gas purge valve according to claim 18, wherein the casing of the pre-loading mechanism is water and dirt sealed.

20. The gas purge valve according to claim 3, wherein the support lever is biased in a direction to displace the sealing assembly into sealing engagement with the valve seating.

21. The gas purge valve according to claim 20, wherein the biasing force is adjustable.

22. The gas purge valve according to claim 3, wherein the valve outlet is of the combined type comprising a major, kinetic outlet for high flow rate gas flow, and an auxiliary, automatic outlet for low flow rate gas flow.

23. The gas purge valve according to claim 22, wherein the auxiliary outlet comprises an aperture adjoined by an auxiliary valve seating, said auxiliary outlet aperture being substantially less in area than the major outlet aperture; a flexible closure membrane secured at one end to the sealing member of the major outlet and adapted to be biased against said auxiliary valve seating so as to seal said auxiliary outlet aperture; the float member being articulated to an opposite end of said membrane.

24. The gas purge valve according to claim 23, wherein the auxiliary valve seating has a substantially elongated slit-like shape, communicating at one end thereof with the major outlet aperture.

25. The gas purge valve according to claim 24, wherein the flexible closure membrane adapted for sealing the auxiliary outlet aperture, is integrally formed with the sealing member adapted for sealing the major valve outlet.

26. The gas purge valve according to claim 24, wherein the opposite end of the closure membrane is articulated to one end of a pivot bar pivotally secured at an opposed end thereof to the sealing member of the major outlet, and articulated to the float member.

27. The gas purge valve according to claim 26, wherein the float member is coupled to the pivot bar via a connecting member.

28. The gas purge valve according to claim 24, wherein the major outlet sealing member is retained by a support member whereby the sealing member has exposed edges for bearing against the boundaries of the major valve seating.

29. The gas purge valve according to claim 28, wherein one face of the exposed edges bears against a bedding of the support member, whilst an opposite face thereof is fitted for sealing engagement with the boundaries of the major valve seating.

30. The gas purge valve according to claim 3, wherein the valve outlet comprises first and second outlet apertures respectively bounded by first and second valve seatings, said first aperture being of substantially elongated slit like shape, communicating at one end thereof with the second outlet aperture and being substantially less in area than the second aperture; a flexible closure membrane secured at one end to a sealing member for said second outlet and adapted to be biased against said valve seatings so as to seal said outlet apertures; the float member being articulated to an opposite end of said membrane.

31. The gas purge valve according to claim 30, wherein the sealing assembly comprises a sealing member for sealing engagement with a seating of the major outlet, and a flexible closure membrane secured at one end to said sealing member and adapted to be biased against a seating of the auxiliary valve outlet so as to seal said; an opposite end of said membrane being articulated to the float member.

* * * * *